United States Patent Office 3,297,544
Patented Jan. 10, 1967

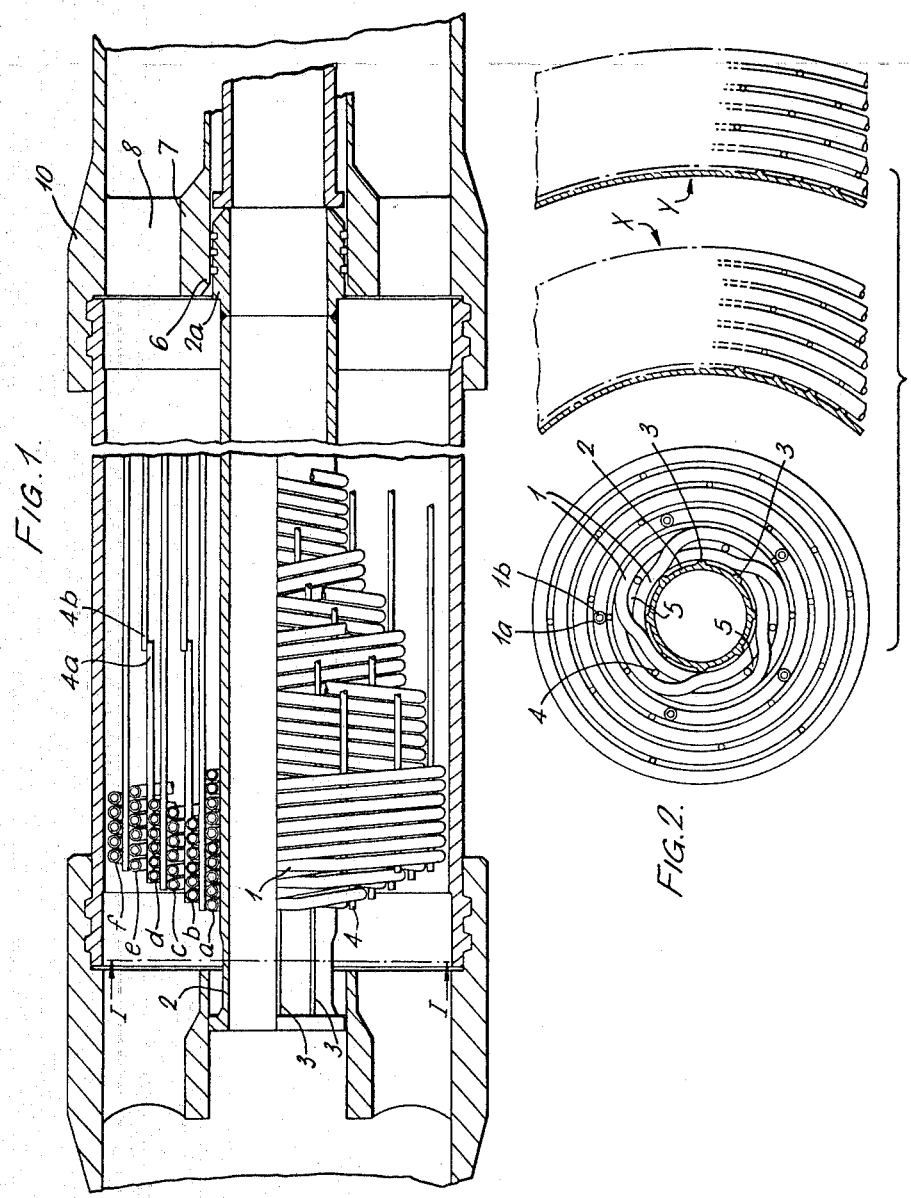

3,297,544
NUCLEAR FUEL BEARING BODIES
Alan Thomas Hooper, Weymouth, and Reginald John Symes, Blandford, England, assignors to United Kingdom Atomic Energy Authority, London, England
Filed Mar. 1, 1965, Ser. No. 436,199
Claims priority, application Great Britain, Feb. 28, 1964, 8,522/64
10 Claims. (Cl. 176—83)

This invention relates to nuclear fuel bearing bodies such as fuel elements for nuclear reactors or to entire reactor cores and aims to provide an improved method of constructing such a fuel element or a core which is particularly adaptable to manufacture by processes involving automation.

According to the present invention a method of distributing and supporting fissile material in a reactor core so as to provide a fixed heat transfer surface which is swept by coolant, resides in forming said material into a number of lengths and winding the lengths into a number of convolutions extending about a common axis.

The convolution may be wound as one or more layers of turns in a manner so as to be self supporting. Alternatively the convolutions may be wound on to a central former which forms finally a part of a fuel element or a reactor core.

Each convolution is preferably such that substantially the entire outer surface of the length of clad fuel material is available as a heat transfer surface when swept by a coolant.

Any technique, or form of winding already proposed or used hitherto in the electrical or electronic industries, suited to the workability of the fuel lengths, may be used. If desired, the convolution may take the form of a single or multi-start helical winding on a former with the turns of the helix either touching or spaced slightly apart. Where several layers of such winding are used one on the other, each layer may be separated from the adjacent layer by spacers extending in a direction parallel with the axis of the former. The successive layers are preferably wound oppositely handed. Alternatively, spacers could be omitted and the layers (of opposite handed helix) laid one upon the other, the coolant flowing through the interstices, the size of which may be varied by change of helix angles and the gap between adjacent turns.

The length of fuel material may be circular, square, rectangular, or any other suitable cross-section.

In order that the invention may be better understood, one example of a fuel element constructed in accordance therewith will now be described with reference to the accompanying drawings in which:

FIG. 1 shows in axial cross-section a part of a nuclear fuel bearing body contained in an outer tube.

FIG. 2 shows a modification of the embodiment shown in FIG. 1, and illustrates an end view of the former and fuel layers of FIG. 1 taken along line 1—1 of FIG. 1 together with a portion of two additional formers and fuel layers formed concentrically about the former of FIG. 1.

If reference is made to the accompanying drawing it will be seen that the body therein shown is composed of a number of compact convolutions of a length 1 of extruded nuclear fuel material of circular section. The fuel is formed in a manner similar to metal-clad, mineral insulated conductors but, in this case, a conventional fuel cladding material 1a, e.g. Zircaloy, encloses compressed particles 1b of a nuclear fuel bearing compound, or mixture which, before extrusion, were in a finely divided powder form. The main structural member of the fuel body is in this example a tubular former 2 having a number of axially extending ribs 3 formed on its periphery. The former 2 is of material having a low nuclear cross-section and tubes of this form and appropriate sizes are available commercially. In forming the fuel body, the former 2 is supported between the centres of a coil-winding machine and a suitably long length or lengths of clad fuel material, having had their end faces sealed, are laid on to the former 2 as a helically wound layer, the turns of the helix being spaced apart slightly from one another and secured at intervals by welding or brazing the cladding material 1a to the ribs 3. Preferably the helix is wound as a multi-start helix as shown in the drawing so that the length of any portion of extruded fuel material need not be great and its terminations can be arranged at the limits of the core height. When the first layer $a$ of turns has been completed, a number of spacers 4 are secured on the first layer to extend parallel with the ribs 3 on the tube 2. The spacers 4 are made of circular cross-section to allow a high degree of precision in manufacture of the element to be obtained and they may take the form of small diameter tubes of the same low nutron absorption cross-section material as the fuel cladding. Once the spacers have been positioned and fixed, a second layer $b$ of helical turns is wound over the spacers. If the extruded lengths are sufficiently long the second layer may be comprised by extensions of the fuel lengths from the first layer $a$ being wound back on the first layer (but spaced therefrom by the spacers 4) to form the second layer. This is achieved by forming in the length of a clad fuel a return bend similar to that used in a power transformer and other electrical machine windings and as shown in the drawing. Successive layers $c \ldots f$ are formed with appropriate spacers until the required quantity of fuel has been embodied in the fuel element. The spacers 4 are deliberately made in lengths shorter than that of the fuel element so that they may be staggered peripherally around each layer for example as indicated at 4$a$, 4$b$ in FIG. 1. This arrangement tends to prevent the return bends of the coils from masking the adjacent coolant passages 5 (FIG. 2).

If desired a predetermined, and if necessary non-uniform, radial distribution of fuel may be provided by introducing an annular row of spacers, at any radial position, having spacers which are of a diameter different from those in other annular rows. Moreover, by varying the pitch of the turns along the length of the former, a variation in axial fuel distribution can be achieved if desired.

Such a fuel element so far described is suitable for insertion in a coolant-swept channel of a nuclear reactor in place of the more normal fuel element of rod-bundle configuration, for example, in a moderator channel of a gas cooled reactor or in a pressure tube within a calandria holding a secondary liquid moderator in a water cooled/moderated reactor such as SGHW reactor. For small compact nuclear reactor cores, such as those which might be used in a marine installation, the whole core may be wound on a single, central former. The layers of the helical turns may be separated by spacers of suitable box-section which would allow the introduction of suitable control absorbers. Alternatively again, a nominally homogeneous core could be built up from a number of concentric formers each supporting one or more layers of helical turns, and positioned as indicated in outline at X and Y in FIG. 2.

In the particular example shown here, the central former 2 serves to position the fuel element within a pressure tube 10 through which pressurized liquid coolant is passed, the coolant flowing through the channels between the spacers 4. The formers are arranged end to end in the pressure tube and located by end portion 2$a$ which enter the bore of a central boss 7 of a spider, the arms 8 of which are attached to the wall of the pressure tube 10.

A number of such pressure tubes may be mounted in a calandria containing a moderator separated from the coolant in known manner.

Instead of being of circular cross-section the clad fuel lengths could be broad in width but of small thickness. A broad ribbon of fuel of this nature could be wound in a helical manner similar to that described above.

Whatever form the fuel element or core may take, the method of construction lends itself to providing any predetermined desired axial gradiation in the fuel distribution by simply varying the pitch of the turns along the length of the coil. Moreover, where a multi-start arrangement is used the length of clad fuel can be interspersed with tapes or wires of similar external dimensions to the clad fuel length but containing a burnable poison. In this way a poison may be evenly distributed throughout the core. Alternatively a length of hollow conduit may be submitted for a length of clad fuel and used to spray water on occasion on to adjacent fuel material to allow emergency cooling.

The method of fabrication proposed could be considered advantageous for plutonium containing fuel because the fuel element fabrication can be carried out by remote control by simple machines well proven in analogous technologies.

As foreshadowed above an entire reactor core could be constructed and assembled by processes analogous to coil winding. For example, FIG. 2 can be considered as plan view of a cylindrical core viewed from one end, with control absorbers insertable into hollow spacers 4 which of course would need to be of somewhat larger diameter than those shown.

We claim:

1. A nuclear fuel element comprising a plurality of superimposed layers of nuclear fuel material supported about a common axis, each layer being in the form of convolutions of nuclear fuel material, the convolutions of each layer being wound as a multistart helix.

2. A nuclear fuel element as claimed in claim 1 wherein the pitch of the said helix is varied along the said axis to establish an axial variation in the distribution of the fuel.

3. A nuclear fuel element as claimed in claim 1 including spacers interposed between successive layers to separate one layer from the adjacent layer.

4. A nuclear fuel element as claimed in claim 3 wherein the spacers are hollow and extend parallel to said axis to allow the introduction of neutron absorbing material in said spacers.

5. A nuclear fuel element as claimed in claim 3 wherein successive rows of spacers are of a different dimension measured radially of the said axis to establish a variation in the distribution of the nuclear material radially about the said axis.

6. A nuclear reactor core comprising a plurality of fuel elements, each of said fuel elements comprising a plurality of superimposed layers of nuclear fuel material supported about a common axis, each layer being in the form of convolutions of nuclear fuel material, the convolutions of each layer being wound as a multistart helix.

7. A nuclear reactor core as claimed in claim 6 wherein the pitch of the said helix is varied to establish an axial variation in the distribution of the fuel.

8. A nuclear fuel element comprising a plurality of superimposed layers of nuclear fuel material supported about a common axis and separated by spacers, each said layer being in the form of convolutions of nuclear fuel material, at least the inner layer comprising a plurality of elongated flexible rods, at least some of said rods including clad nuclear fuel material and wound as a multistart helix, the pitch of said helix being varied along the axis of the element to establish an axial variation in the distribution of the fuel.

9. A body containing nuclear fuel supported in a manner such that the fuel presents a heat exchange surface with respect to coolant past over the body, the body comprising a plurality of superimposed layers of nuclear fuel material, each of said layers forming convolutions of nuclear fuel material, spacers between said layers, the fuel material in each of said layers comprising a plurality of elongated flexible rods of clad fuel material wound as a multistart helix, the number of rods corresponding at least to the number of starts in said multistart helix.

10. A body as claimed in claim 9 including some lengths of material incorporating burnable poisons.

References Cited by the Examiner

UNITED STATES PATENTS

| | | | |
|---|---|---|---|
| 2,968,601 | 1/1961 | Evans et al. | 176—83 X |
| 2,981,672 | 4/1961 | Kingston | 176—83 X |
| 2,985,576 | 5/1961 | Hollings | 176—83 X |
| 3,074,873 | 1/1963 | Kling et al. | 176—83 X |
| 3,173,843 | 3/1965 | Simpson | 176—83 X |
| 3,175,955 | 3/1965 | Cheverton | 176—83 X |

CARL D. QUARFORTH, *Primary Examiner.*

BENJAMIN R. PADGETT, *Examiner.*

M. J. SCOLNICK, *Assistant Examiner.*